United States Patent [19]
Cuthbertson

[11] 3,836,827
[45] Sept. 17, 1974

[54] CURIE POINT AMBIENT TEMPERATURE SENSOR

[75] Inventor: Kenneth J. Cuthbertson, Willowdale, Ontario, Canada

[73] Assignee: Honeywell Inc., Minneapolis, Minn.

[22] Filed: Aug. 1, 1973

[21] Appl. No.: 384,527

[30] Foreign Application Priority Data
Mar. 2, 1973  Canada .............................. 162803

[52] U.S. Cl. .............. 317/133, 73/362 CP, 335/208
[51] Int. Cl. ........................ H01h 37/58, G01k 7/00
[58] Field of Search ................ 73/362 CP; 317/133; 335/146, 208

[56] References Cited
UNITED STATES PATENTS

| | | | |
|---|---|---|---|
| 822,323 | 6/1906 | Thomson | 335/146 |
| 3,295,081 | 12/1966 | Bowyer et al. | 335/208 |
| 3,513,313 | 5/1970 | Schwartz | 73/355 R X |
| 3,538,467 | 11/1970 | Middendorf | 335/146 |
| 3,649,936 | 3/1972 | Masuda et al. | 335/208 |

Primary Examiner—Richard C. Queisser
Assistant Examiner—Frederick Shoon
Attorney, Agent, or Firm—Lamont B. Koontz; Trevor B. Joike

[57] ABSTRACT

A thermoferrite thermostat is disclosed which includes a thermoferrite material having a temperature gradient established from one end to the other and having a Curie point temperature selected to fall between the extremes of said temperature gradient such that a Curie point interface is established which is defined as the dividing region between that portion of material which lies below said temperature and is therefore magnetic and a magnetic sensor which may be in form of a reed switch for sensing the position of said interface. Said temperature gradient may be established by either supplying current to a Curie point material having a non-uniform cross section or to a heater located at one end of a Curie point material.

10 Claims, 4 Drawing Figures

CURIE POINT AMBIENT TEMPERATURE SENSOR

BACKGROUND OF THE INVENTION

This invention relates to a temperature sensing device suitable for use as a thermostat control.

This invention employs a thermoferrite material or other type of thermomagnetic material having a preselected Curie point temperature. If a temperature gradient is generated across the material such that the Curie point temperature falls between the extremes of the temperature gradient, that part of the material which is above the Curie point temperature will be non-magnetic and the remainder of the material, which is below the Curie point temperature, will be magnetic. The dividing line between the magnetic and nonmagnetic portions of the thermoferrite or thermomagnetic material will be hereinafter referred to as the Curie point interface.

The position of the interface may be sensed by a magnetically responsive device such as a reed switch or Hall effect device. The sensor can be connected to an indicator or to a furnace control and used as a thermostat. If the sensor is made adjustable, the control point of the thermostatic system can be varied.

The temperature gradient can be established either by supplying current, preferably constant current, to a piece of Curie point material having a non-uniform cross-section or by supplying a current to a heater located at one end of a piece of Curie point material.

The sole limitation on the type of thermomagnetic material chosen is that it have a suitable Curie point temperature. By way of example, manganese zinc ferrite may be used as the thermomagnetic material.

This invention will permit using relatively imperfect and imprecisely reproducible thermomagnetic materials in an adjustable and highly precisioned temperature responsive device.

The invention will be best understood in the following description of specific embodiments when read in connection with the accompanying drawings in which:

FIG. 1 is a diagram of one form of the invention;
FIG. 2 shows a top view of the thermomagnetic material shown in FIG. 1;
FIG. 3 shows a second form of the invention; and,
FIG. 4 shows the permeability versus temperature curve of a thermoferrite or thermomagnetic material.

The ambient temperature sensing device 11, shown in FIG. 1, comprises a piece of thermomagnetic material 12 supplied with current over lines 13 and 14 from a source of constant current 15. The thermoferrite or thermomagnetic material 12 has a non-uniform cross section over its length. Because of I²R losses, a temperature gradient will exist over the length of the thermoferrite material, having a higher temperature, e.g., 90° F, at the end having the smaller relative cross sectional area, and a lower temperature, e.g. 80° F, at the end having the larger relative cross section.

If the Curie point temperature is selected between the temperature extremes of the temperature gradient, reference numeral 16 depicts the line dividing the regions established by the Curie point temperature of the thermoferrite material 12. The portion 17 of thermomagnetic material 12 existing at a temperature above the Curie point temperature will be non-magnetic as shown by the magnetization vectors 18. The magnetization vectors 18 represent the magnetization vectors of the various domains in portion 17 of thermomagnetic material 12. Since these vectors are scattered, the net magnetization vector of material 17 will be such as to render portion 17 non-magnetic. The portion 21 of thermomagnetic material 12 existing below the Curie point temperature will be magnetic as shown by magnetization vectors 22 which are oriented by permanent magnet 26. The reference line 16 dividing portion 17 and 21 may be termed the Curie point interface.

The temperature of the Curie point material 12 is raised to a point higher than the ambient temperature such that material 12 will dissipate heat to the ambient. Thus, the position of Curie point interface 16 between the ends 19 and 20 of the material 12 will depend upon the ambient temperature to which the material 12 is exposed. An increase in ambient temperature will cause the interface 16 to lower whereas a decrease in ambient temperature will cause interface 16 to raise. This shifting of the interface relative to changes in ambient temperature may be sensed by a suitable magnetic means. In the embodiment shown, a reed switch 23 will be operated dependent upon the position of the Curie point interface. Reed switch 23 is adapted to be connected by lines 24 and 25 to a suitable indicating or control apparatus. The control apparatus may take the form of a gas valve in a furnace apparatus for the purpose of temperature control.

A permanent magnet 26 is added to properly orient the magnetic vectors of the magnetic region 21. The material 12 and magnet 26 rest upon supporting structure 27.

Other types of magnetic sensors may be used in place of the reed switch 23. For instance, a Hall effect device can be used to sense the position of the interface 16.

The reed switch 23 can be made to be manually adjusted by varying its location with respect to the thermoferrite to vary the temperature at which the switch 23 will respond to the thermomagnetic material 12. It can also be noted that the value of the constant current from source 15 can be altered to also adjust the position of the interface to which the switch 23 will respond, or the position of material 12 may be adjustable. Such adjustments will eliminate the need of an exact Curie point material, which has been one of the failings of the prior art temperature responsive thermomagnetic devices.

Figure 3:
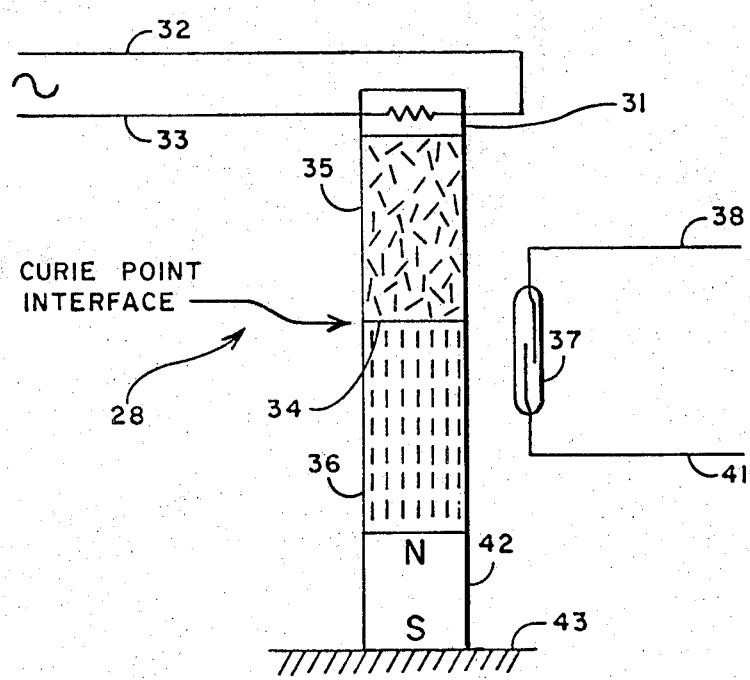
Figure 4:
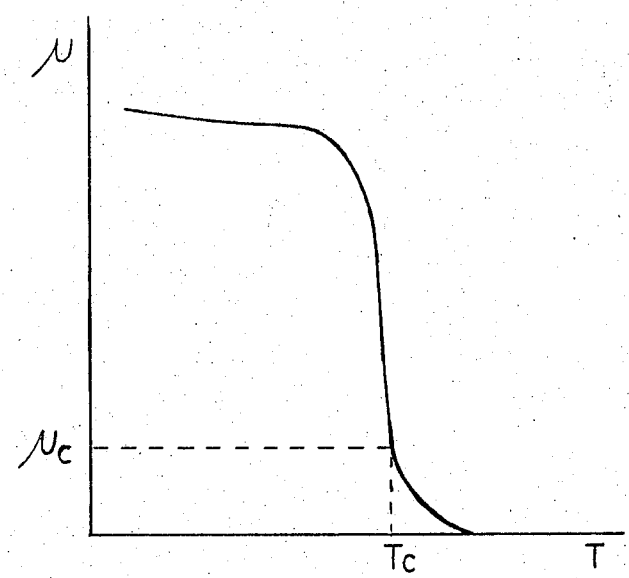
FIG. 4 shows the permeability versus temperature curve for a typical thermomagnetic or thermoferrite material. It can be seen from this graph that as the temperature of the material increases the permeability decreases. $T_c$, the Curie point temperature, is the temperature above which the permeability is insufficient to exhibit any substantial magnetic properties.

FIG. 3 shows a second embodiment of the invention which comprises a thermomagnetic material 28, having a heating means 31 positioned at one end of material 28 and being supplied with current from an alternating source over lines 32 and 33. Because the source 31 is affixed to one end of the material 28, its heat will generate a temperature gradient over the length of material 28 such that one end of the material, that nearest the heater 31, will be at a higher temperature than the end farthest away from the heater 31. A Curie point interface 34 will thus be established dividing the material 28 into a nonmagnetic portion 35 and a magnetic portion 36. A reed switch 37 is shown for sensing the position of the interface and is adapted to be connected, over lines 38 and 41, to a suitable indicating or control device. The bar 28 may be of uniform cross section. As in FIG. 1, if the Curie point temperature of the material 28 is properly selected, the line 34 will represent the dividing line of the material 28 above which portion 35 will exist at a temperature higher than the Curie point and below which portion 36 will exist at a temperature lower than the Curie point temperature.

The heater 31 may comprise a PTC resistor. If A PTC resistor is used, a constant current source is not needed since the PTC resistor will establish a constant temperature at the heated end, despite variations in line voltage. The PTC resistor is current limiting at a predetermined operating temperature to establish the desired temperature gradient across thermoferrite 28.

The material 28 is associated with a permanent magnet 42 and the entire structure rests upon support 43.

As the ambient temperature to which the material 28 is exposed changes, the interface 34 will move up and down the material 28.

Figure 1:
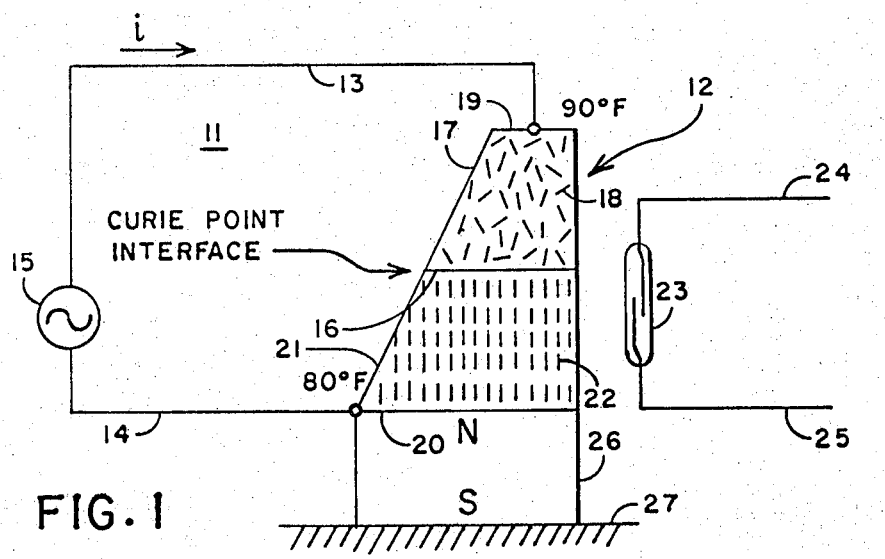
Figure 2:
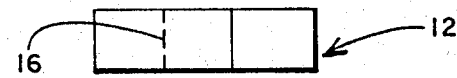
FIG. 2 is a top view of the thermoferrite material 12.

FIGS. 1 and 3 show two forms or two ways of establishing a temperature gradient across a piece of thermomagnetic or thermoferrite material. As many apparently different embodiments of establishing this temperature gradient may be made without departing from the spirit and scope of the inveniton, it is to be understood that this invention is not limited to the sepcific embodiments shown herein, except as defined in the appended claims.

The embodiments of the invention in which an exclusive property or right is claimed are defined as follows:

1. An ambient temperature sensing device comprising:
    a material having a pre-selected Curie point and having two ends;
    means for establishing a temperature gradient across said material thereby establishing a Curie point interface positioned between said ends wherein said material on one side of said interface is magnetic and on the other side of said interface is nonmagnetic, the position of said interface being dependent upon said ambient temperature; and,
    a magnetic sensor for sensing the position of said interface.

2. The ambient temperature sensing device of claim 1 further comprising a permanent magnet associated with said material.

3. The ambient temperature sensing device of claim 1 wherein said sensor comprises a reed switch.

4. The ambient temperature sensing device of claim 1 wherein said means for establishing a constant temperature gradient comprises a constant current source, said material being of non-uniform cross-section, wherein one end has a relatively large cross-section, and means connecting said source to said material whereby current from said constant current source flows between said relatively small and relatively large ends.

5. The ambient temperature sensing device of claim 4, wherein said sensor is a reed switch.

6. The ambient temperature sensing device of claim 1, wherein said means for establishing a constant temperature gradient comprises a source of current and a heater attached to one end of said material.

7. The ambient temperature sensing device of claim 6 further comprising a permanent associated with said material.

8. The ambient temperature sensing device of claim 6 wherein said heater comprises a PTC resistor.

9. The ambient temperature sensing device of claim 8 wherein said sensor comprises a reed switch.

10. The method of sensing an ambient temperature comprising:
    exposing material, having a pre-selected Curie point and having two ends, to said ambient temperature;
    establishing a temperature gradient across said material thereby establishing a Curie point interface between said ends; and,
    sensing the position of said interface.

* * * * *